United States Patent
Liu

(10) Patent No.: US 10,108,567 B2
(45) Date of Patent: Oct. 23, 2018

(54) MEMORY CHANNEL SELECTION CONTROL

(71) Applicant: Integrated Device Technology, Inc., San Jose, CA (US)

(72) Inventor: Yingnan Liu, San Jose, CA (US)

(73) Assignee: INTEGRATED DEVICE TECHNOLOGY, INC., San Jose, CA (US)

(*) Notice: Subject to any disclaimer, the term of this patent is extended or adjusted under 35 U.S.C. 154(b) by 34 days.

(21) Appl. No.: 15/388,224

(22) Filed: Dec. 22, 2016

(65) Prior Publication Data

US 2018/0181510 A1 Jun. 28, 2018

(51) Int. Cl.
| G06F 13/00 | (2006.01) |
| G06F 13/14 | (2006.01) |
| G06F 13/16 | (2006.01) |
| G06F 13/36 | (2006.01) |
| G06F 13/40 | (2006.01) |

(52) U.S. Cl.
CPC .......... *G06F 13/36* (2013.01); *G06F 13/4068* (2013.01)

(58) Field of Classification Search
CPC combination set(s) only.
See application file for complete search history.

(56) References Cited

U.S. PATENT DOCUMENTS

| 5,333,278 A * | 7/1994 | Miyazono | G06F 9/445 710/104 |
| 5,787,493 A * | 7/1998 | Niijima | G06F 12/10 711/152 |

OTHER PUBLICATIONS

Datasheet—IDTQS3VH253, "Quickswitch Products 2.5V/3.3V Dual 4:1 MUX/DEMUX High Bandwidth Bus Switch", http://www.idt.com/document/dst/qs3vh253-datasheet, Feb. 2014, pp. 1-8.

* cited by examiner

*Primary Examiner* — David E Martinez
(74) *Attorney, Agent, or Firm* — Christopher P. Maiorana, PC

(57) ABSTRACT

An apparatus comprising a first circuit, a second circuit and a channel decoder. The first circuit may comprise (i) a controller port and (ii) a plurality of memory ports. The second circuit may comprise (i) input port and (ii) a plurality of output ports. The channel decoder may be configured to decode a selection signal. The channel decoder may be configured to select (i) one of the plurality of memory ports and (ii) one of the plurality of output ports in response to the decoded selection signal. The selection signal may be received by the controller port and the channel decoder in a first mode. The selection signal may be received by the input port and the channel decoder in a second mode.

18 Claims, 5 Drawing Sheets

US 10,108,567 B2

MEMORY CHANNEL SELECTION CONTROL

FIELD OF THE INVENTION

The invention relates to memory access generally and, more particularly, to a method and/or apparatus for implementing a memory channel selection control.

BACKGROUND

Conventional solid state drives implement channel selection using a multiplexer (MUX). Channel selection for the multiplexer is done by using a general purpose input/output (GPIO) pin control. The GPIO pin is controlled by a solid state drive controller (i.e., microcontroller unit) firmware.

Flash memory, such as NAND flash, is controlled by hardware logic. When the memory hardware logic needs to switch NAND flash modules, the hardware logic sends a command to the microcontroller unit (MCU). The MCU firmware sends a control signal to the GPIO pin to select the memory channel. Sending a command from the hardware logic to the MCU and then receiving a control signal from the GPIO pin will cause some delay. The delay has a negative impact on solid state random read/write performance.

It would be desirable to implement a memory channel selection control.

SUMMARY

The invention concerns an apparatus comprising a first circuit, a second circuit and a channel decoder. The first circuit may comprise (i) a controller port and (ii) a plurality of memory ports. The second circuit may comprise (i) input port and (ii) a plurality of output ports. The channel decoder may be configured to decode a selection signal. The channel decoder may be configured to select (i) one of the plurality of memory ports and (ii) one of the plurality of output ports in response to the decoded selection signal. The selection signal may be received by the controller port and the channel decoder in a first mode. The selection signal may be received by the input port and the channel decoder in a second mode.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a memory channel selection control that may (i) reduce channel selection delay, (ii) improve random read/write performance, (iii) use a flash memory signal to decode a channel selection control command, (iv) decode a flash signal from controller hardware logic, (v) implement a memory interface, (vi) bypass a general purpose input/output control pin of a solid state drive controller and/or (vii) be implemented as one or more integrated circuits.

Figure 1:
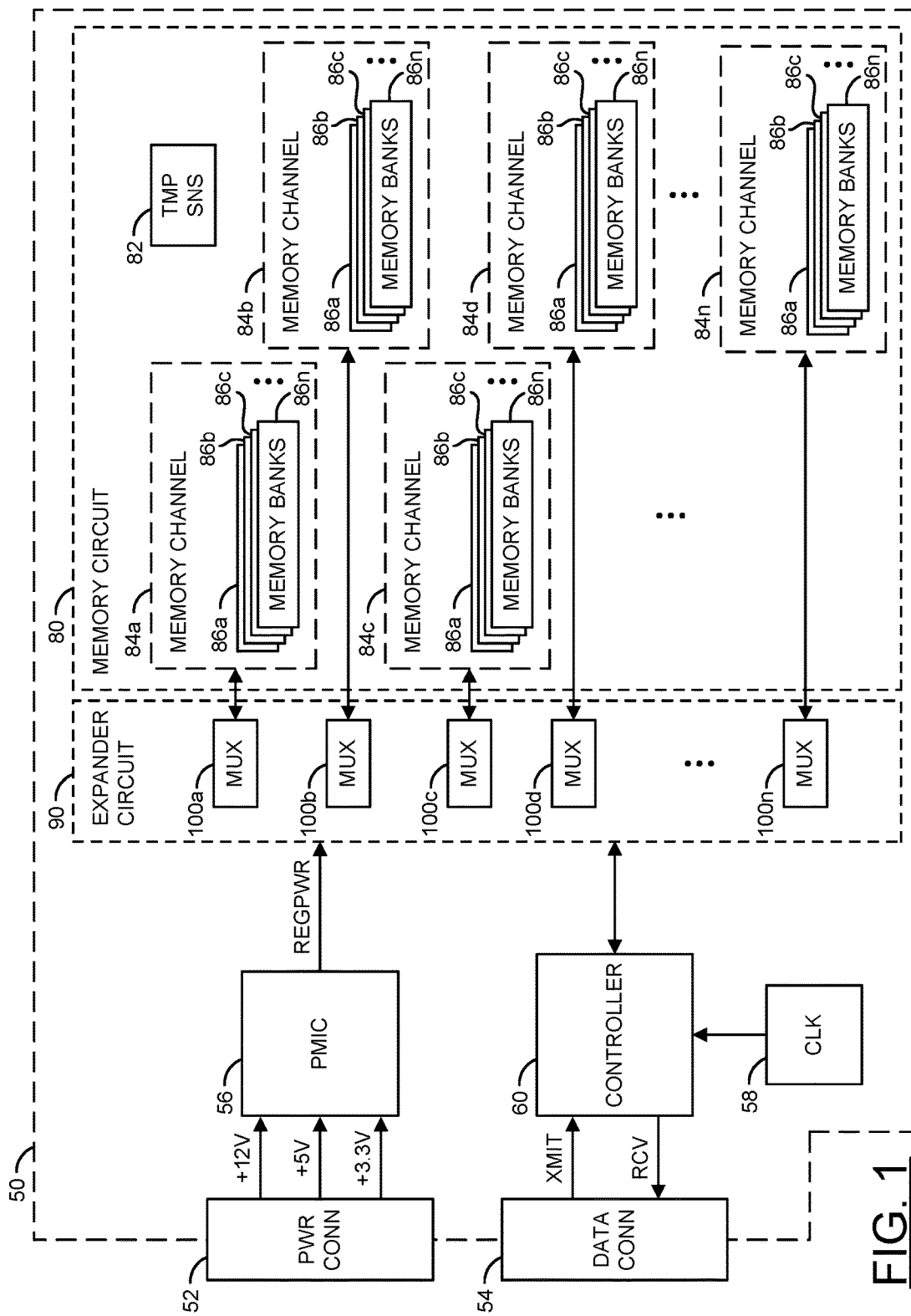
FIG. 1 is a block diagram illustrating the present invention in an example context of a solid state drive.

Referring to FIG. 1, a block diagram illustrating the present invention in an example context of a solid state drive is shown. A block (or circuit) 50 is shown. The circuit 50 may be configured to implement data storage and/or data access. In one example, the circuit 50 may implement a solid state drive (SSD).

The solid state drive 50 may comprise a block (or circuit) 52, a block (or circuit) 54, a block (or circuit) 56, a block (or circuit) 58, a block (or circuit) 60, a block (or circuit) 80 and/or a block (or circuit) 90. The circuit 52 may be configured to implement a power connector. The circuit 54 may be configured to implement a data connector. The circuit 56 may be configured to implement a power management integrated circuit (PMIC). The circuit 58 may be configured to implement a clock circuit. The circuit 60 may be configured to implement a controller. The circuit 80 may be configured to implement a memory circuit. The circuit 90 may be configured to implement an expander circuit. The solid state drive 50 may implement other circuits, components and/or connections (not shown). The number and/or type of components implemented by the solid state drive 50 may be varied according to the design criteria of a particular implementation.

The power connector 52 may be configured to provide power to the solid state drive 50. The power connector 52 may receive power from an external source. In one example, the power connector 52 may receive power from a power supply of a desktop computer. In another example, the power connector 52 may receive power from a motherboard. The power connector 52 is shown providing power signals (e.g., +12V, +5V, +3.3V, etc.) to the power management integrated circuit 56.

The data connector 54 may be configured to transfer (e.g., send/receive) data. The data connector 54 may present a signal (e.g., XMIT) to the controller 60. The data connector 54 may receive a signal (e.g., RCV) from the controller 60. In one example, the signal XMIT may transmit data from an external source to the controller 60 (e.g., to be stored in the memory circuit 80). In another example, the signal RCV may transmit data stored in the memory circuit 80 to the external source (e.g., a SATA port of a motherboard).

The power connector 52 and/or the data connector 54 may be implemented according to a pre-determined connection protocol. In one example, the power connector 52 and the data connector 54 may be SATA connectors (e.g., SATA2, SATA3, etc.). In another example the power connector 52 and the data connector 54 may implement a PCIe connector. Other connectors may be implemented (e.g., M.2). The type of connection may be varied according to the design criteria of a particular implementation.

The power management integrated circuit 56 may be configured to provide power to the various components of the solid state drive 50. The power management integrated circuit 56 is shown presenting a signal (e.g., REGPWR) to the circuit 90. The signal REGPWR may be presented to other components (e.g., the controller 60, the memory circuit 80, etc.). The signal REGPWR may provide stable and/or regulated power based on the specifications of the components of the solid state drive 50.

The controller 60 may be configured to manage the operations of the solid state drive 50. The input/output data to/from the data connector 54 and/or the memory circuit 80 may flow through the controller 60. The controller 60 is shown connected to the expander circuit 90. The controller 60 may be connected to other components of the solid state drive 50.

The controller 60 may be configured to generate command signals. The command signals generated by the controller 60 may provide instructions to the various components of the solid state drive 50. In an example, the command signals may provide instructions on where data should be stored, where to move stored data, which data to retrieve from the memory circuit 80, etc. The format of the command signals may be varied according to the design criteria of a particular implementation.

The memory circuit 80 may be configured to store data. The memory circuit 80 may comprise a block (or circuit) 82 and/or blocks (or circuits) 84a-84n. The circuit 82 may be configured to implement a temperature sensor. The temperature sensor may be configured to determine whether the memory circuit 80 is operating within a safe temperature range. The circuits 84a-84n may comprise memory channels. The memory circuit 80 may comprise other components and/or connections (not shown). The number and/or type of components of the memory circuit 80 may be varied according to the design criteria of a particular implementation.

The memory channels 84a-84n may comprise blocks (or circuits) 86a-86n. The circuits 86a-86n may comprise memory banks. In some embodiments, each of the memory channels 84a-84n may comprise the same number of the memory banks 86a-86n. In one example, each of the memory channels may comprise four of the memory banks 84a-84n. The number of memory channels 84a-84n and/or the number of memory banks 86a-86n in each of the memory channels 84a-84n may be varied according to the design criteria of a particular implementation.

The memory banks 84a-84n may comprise data storage circuits. The data storage circuits may be configured to store data. In some embodiments, the memory banks 84a-84n may comprise flash memory. In one example, the data storage circuits may comprise NAND flash memory cells. In another example, the data storage circuits may comprise NOR flash memory cells. The NAND flash memory cells may comprise at least one or more of single-level cell (e.g., SLC) flash memory, multi-level cell (e.g., MLC) flash memory and/or triple-level cell (e.g., TLC) flash memory. The amount and/or types of memory cells implemented by the memory banks 84a-84n may be varied according to the design criteria of a particular implementation.

The expander circuit 90 may be configured to interface between the controller 60 and the memory circuit 80. The expander circuit 90 may receive data from one or more of the memory banks 86a-86n of one or more of the memory channels 84a-84n and transmit the data to the controller 60. The expander circuit 90 may receive data from the controller 60 and transmit the data to one or more of the memory banks 86a-86n of one or more of the memory channels 84a-84n. The expander circuit 90 may comprise blocks (or circuits) 100a-100n. The circuits 100a-100n may comprise multiplexer circuits.

The expander circuit 90 may be configured to enable the controller 60 to access an expanded amount of memory in the memory circuit 80. For example, the memory circuit 80 may comprise a larger storage capacity because the expander circuit 90 enables more memory to be addressed by the controller 60. For example, the expander circuit 90 may enable the controller 60 to access four times more flash memory. In an example without the expander circuit 90, the controller 60 may be configured to access the memory channels 84a-84n, but not access all of the memory banks 86a-86n of each of the memory channels 84a-84n without sending a control signal from a general purpose input/output (GPIO). Accessing the memory banks 86a-86n using the GPIO of the controller 60 may result in a delay. In an example with the expander circuit 90, the controller 60 may be configured to provide a selection control command to the multiplexers 100a-100n and the multiplexers 100a-100n may decode the selection control command.

The multiplexers 100a-100n may select one of the memory banks 86a-86n in the memory channels 84a-84n in response to decoding the selection control command from the controller 60. Providing the selection control command to the multiplexers 100a-100n may enable the controller 60 to access the memory banks 86a-86n in the memory channels 84a-84n. Accessing the memory banks 86a-86n using the expander circuit 90 and/or the multiplexers 100a-100n may bypass the GPIO pin of the controller 60. Bypassing the GPIO pin of the controller 60 may reduce a memory access delay and/or improve read/write performance of the solid state drive 50.

Figure 2:
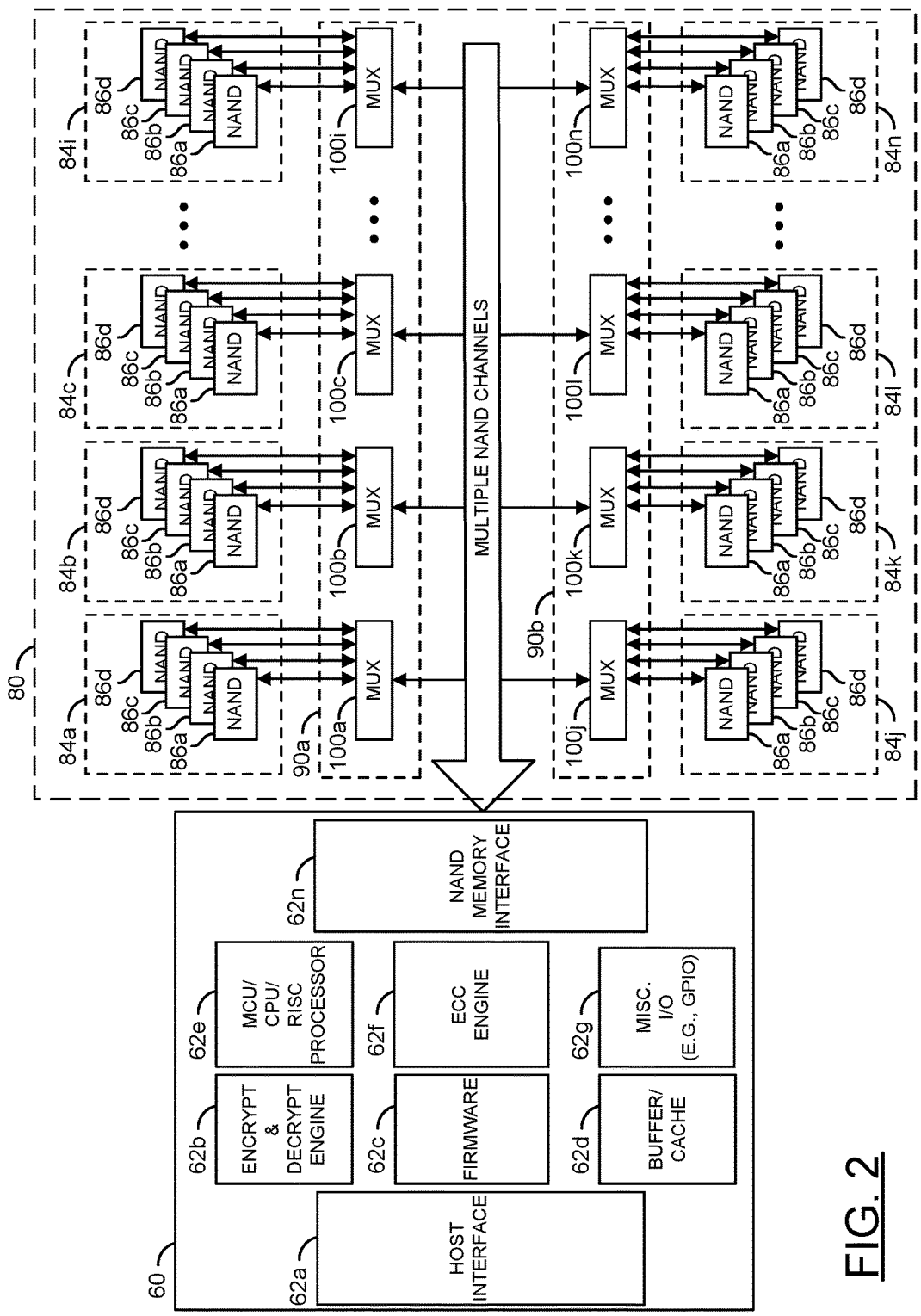
FIG. 2 is a block diagram illustrating components of a solid state drive controller and a memory circuit.

Referring to FIG. 2, a block diagram illustrating components of the solid state drive controller 60 and the memory circuit 80 are shown. In the example shown, the controller 60 may comprise various components 62a-62n. The components 62-62n may comprise a host interface 62a, a encrypt and decrypt engine 62b, firmware 62c, a buffer/cache 62d, a processor 62e, an error-correction code (ECC) engine 62f, a miscellaneous input/output 62g and/or a NAND memory interface 62n. The number and/or function of the components 62a-62n of the solid state drive controller 60 may be varied according to the design criteria of a particular implementation.

The host interface 62a may provide an interface between the controller 60 and the data connector 54. Generally, the host interface 62a is implemented based on the type of data connector 54 (e.g., SATA, PCIe, M.2, etc.). In one example, the host interface 62a may be configured to convert data to a format in compliance with the SATA standard. The encrypt and decrypt engine 62b may be configured to provide data security for information stored in the memory circuit 80. For example, the encrypt and decrypt engine 62b may perform encryption on data input to the solid state drive 50 and/or perform decryption on encrypted data stored in the memory circuit 80.

The firmware 62c may store low-level instructions for the operation of the controller 60. The buffer/cache 62d may provide temporary data storage for data being transmitted to/from the memory circuit 80. The processor 62e may be configured to generate the command signals. The processor 62e may be implemented as a microcontroller unit, a central processing unit, a reduced instruction set computing processor, etc.

The error-correction code engine 62f may be configured to decode data stored by the memory circuit 80. In an example, the data stored by the NAND flash circuits may accumulate erroneous bit values over time. The error-correction code engine 62f may correct the erroneous bit values to retrieve readable data from the memory circuit 80. The miscellaneous input/output 62g may implement the general purpose input/output pin for the controller 60. Selecting the memory banks 86a-86n using the general purpose input output pin may increase an amount of delay for a read/write operation compared to selecting the memory banks 86a-86n using the multiplexers 100a-100n.

The NAND memory interface 62n may be configured to implement an interface between the controller 60 and the memory circuit 80. The NAND memory interface 62*n* may transfer data, control signals and/or command signals from the controller 60 (e.g., the processor 62*e*) to the memory circuit 80. The NAND memory interface 62*n* may transfer data from the memory circuit 80 to the controller 60. In the example shown, the memory interface 62*n* is implemented as a NAND memory interface. Other types of memory interfaces may be implemented. The type of memory interface implemented may be varied based on the type of memory implemented by the memory circuit 80. In one example, the NAND memory interface 62*n*, the memory circuit 80, the expander circuit 90 and/or the multiplexers 100*a*-100*n* may be implemented to comply with the Open NAND Flash Interface (ONFI) 4.0 specification, April 2014, published by the ONFI Working Group, appropriate sections of which are hereby incorporated by reference in their entirety.

Each of the multiplexers 100*a*-100*n* may be associated with a respective one of the memory channels 84*a*-84*n*. For example, the multiplexer 100*a* may be associated with the memory channel 86*a*, the multiplexer 100*b* may be associated with the memory channel 86*b*, the multiplexer 100*c* may be associated with the memory channel 86*c*, etc. The multiplexers 100*a*-100*n* may be configured to access (e.g., address) each of the memory banks 86*a*-86*n* of the associated one of the memory channels 84*a*-84*n*. For example, the multiplexer 100*a* may access the memory banks 86*a*-86*n* of the memory channel 84*a*.

In the example shown, the expander circuit 90 may be two separate circuits (e.g., the expander circuits 90*a*-90*b*). For example, the expander circuit 90*a* may access (or address) one portion of the memory channels (e.g., 84*a*-84*i*) and the expander circuit 90*b* may access (or address) another portion of the memory channels (e.g., 84*j*-84*n*). In the example shown, the expander circuits 90*a*-90*b* and/or the multiplexers 100*a*-100*n* are shown as a component of the memory circuit 80. In some embodiments, the expander circuits 90*a*-90*b* and/or the multiplexers 100*a*-100*n* may be a component of the controller 60. For example, the expander circuits 90*a*-90*b* and/or the multiplexers 100*a*-100*n* may be implemented as part of the memory interface 62*n*. In some embodiments, the expander circuits 90*a*-90*b* and/or the multiplexers 100*a*-100*n* may be implemented as a circuit separate from the controller 60 and the memory circuit 80. For example, the expander circuits 90*a*-90*b* and/or the multiplexers 100*a*-100*n* may be implemented as an integrated circuit connected between the controller 60 and the memory circuit 80. The physical location of the expander circuits 90*a*-90*b* and/or the multiplexers 100*a*-100*n* may be varied according to the design criteria of a particular implementation.

In the example shown, the memory banks 86*a*-86*n* may comprise NAND flash memory. In the example shown, each of the memory channels 84*a*-84*n* may comprise four of the NAND memory banks (e.g., 86*a*-86*d*). In the example shown, each of the multiplexers 100*a*-100*n* may be configured to access four memory banks (e.g., 84*a*-84*d*). The number of memory banks 86*a*-86*n* accessible by each of the multiplexers 100*a*-100*n* may be varied according to the design criteria of a particular implementation.

Figure 3:
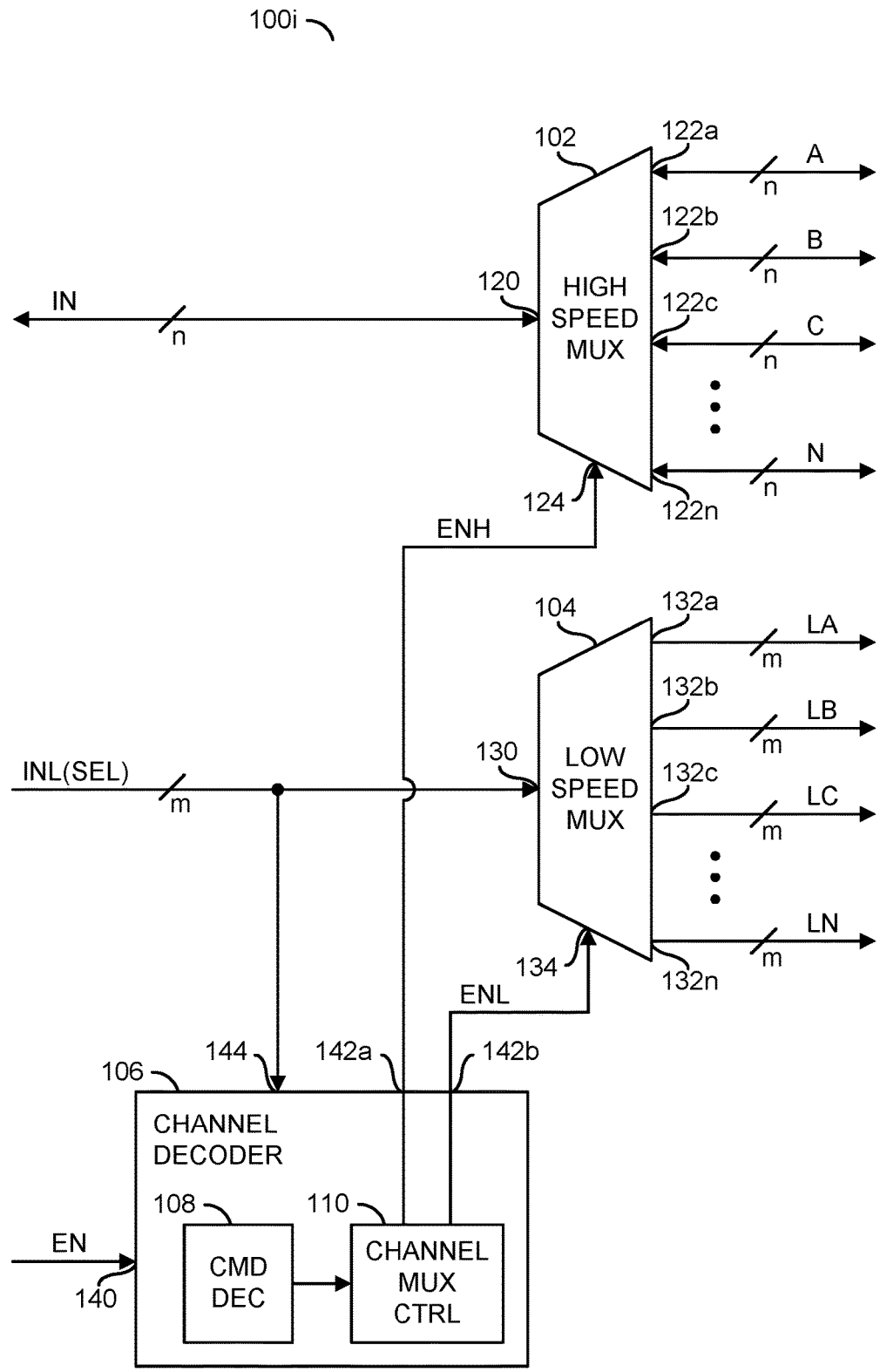
FIG. 3 is a block diagram illustrating a multiplexer pair.

Referring to FIG. 3, a block diagram illustrating an example multiplexer pair 100*i* is shown. The multiplexer pair 100*i* may be a representative example of one of the multiplexers 100*a*-100*n*. The multiplexer pair 100*i* may comprise a block (or circuit) 102, a block (or circuit) 104 and/or a block (or circuit) 106. The circuit 102 may be configured to implement a first multiplexer. The circuit 104 may be configured to implement a second multiplexer. The first multiplexer 102 and the second multiplexer 104 may implement a multiplexer pair. The circuit 106 may be configured to implement a channel decoder. The multiplexer pair 100*i* may comprise other components. The number, type and/or arrangement of components of the multiplexer pair 100*i* may be varied according to the design criteria of a particular implementation.

The multiplexer 102 may be configured as a high speed multiplexer circuit. In an example, the high speed multiplexer 102 may transfer high speed signals between the controller 60 and/or the associated memory channel 84*i*. The multiplexer 104 may be configured as a low speed multiplexer circuit. In an example, the low speed multiplexer 104 may transfer low speed signals from the controller 60 and to the associated memory channel 84*i*.

The high speed multiplexer 102 may comprise an input/output port 120, input/output ports 122*a*-122*n* and/or an input port 124. The input/output port 120 may be a controller port. The input/output ports 122*a*-122*n* may be memory ports. The input port 124 may be an enable port. The high speed multiplexer 102 may implement the controller port 120 and the memory ports 122*a*-122*n* to enable a high speed multiplexer path.

The controller port 120 may be a bi-directional port. The controller port 120 may be configured to send/receive a signal (e.g., IN) to/from the controller 60. The signal IN may transfer high speed data. In one example, the signal IN may be a 12-bit signal. The data transmitted by the signal IN may comprise high speed signals (e.g., DQ, DQS, CLK, etc.). The type of signals carried and/or the amount of bits transferred by the signal IN may be varied according to the design criteria of a particular implementation.

The memory ports 122*a*-122*n* may be bi-directional ports. The memory ports 122*a*-122*n* may be configured to send/receive a respective signal (e.g., A-N) to/from the associated memory channel 84*i*. The signals A-N may transfer high speed data. In one example, the signals A-N may each be a 12-bit signal. The data transmitted by the signals A-N may comprise high speed signals (e.g., DQ, DQS, CLK, etc.). The type of signals carried and/or the amount of bits transferred by the signals A-N may be varied according to the design criteria of a particular implementation.

The signals A-N may correspond to the signal IN. In one example, the high speed multiplexer 102 may transfer (e.g., pass through) one of the signals A-N (e.g., sent by the memory channel 84*i* and received by one of the memory ports 122*a*-122*n*) as an output as the signal IN (e.g., received from the controller port 120). In another example, the high speed multiplexer 102 may transfer (e.g., pass through) the signal IN (e.g., received by the controller port 120) as an output as one of the signals A-N (e.g., from one of the memory ports 122*a*-122*n*). In one example, when the number of memory ports 122*a*-122*n* is four, the high speed multiplexer 102 may implement a 4:1 high speed multiplexer path.

The enable port 124 may be a unidirectional input for the high speed multiplexer 102. The enable port 124 may receive a signal (e.g., ENH). The signal ENH may be implemented to select one of the memory ports 122*a*-122*n*. One of the memory ports 122*a*-122*n* may be enabled in response to the signal ENH. In response to the signal ENH, one of the memory ports 122*a*-122*n* may be enabled (e.g., pass through to/from the signal IN) and the remaining memory ports 122*a*-122*n* may be disabled (e.g., tri-stated). In one example, in response to the signal ENH, the high speed multiplexer 102 may enable the memory port 122*a* and tri-state the memory ports 122b-122n and the data from the signal IN may be passed through the memory port 122a and output as the signal A.

The low speed multiplexer 104 may comprise an input port 130, output ports 132a-132n and/or an input port 134. The input port 134 may be an enable port. The low speed multiplexer 104 may implement the input port 130 and the output ports 132a-132n to enable a low speed multiplexer path.

The input port 130 may be a unidirectional input port. The input port 130 may be configured to receive a signal (e.g., INL) from the controller 60. The signal INL may transfer low speed data. In one example, the signal INL may be a 4-bit signal. The data transmitted by the signal INL may comprise low speed signals (e.g., CE, CLE, ALE, etc.). The type of signals carried and/or the amount of bits transferred by the signal INL may be varied according to the design criteria of a particular implementation.

The output ports 132a-132n may be unidirectional output ports. The output ports 132a-132n may be configured to send a respective signal (e.g., LA-LN) to the associated memory channel 84i. The signals LA-LN may transfer low speed data. In one example, the signals LA-LN may each be a 4-bit signal. The data transmitted by the signals LA-LN may comprise low speed signals (e.g., CE, CLE, ALE, etc.). The type of signals carried and/or the amount of bits transferred by the signals LA-LN may be varied according to the design criteria of a particular implementation.

The signals LA-LN may correspond to the signal INL. In one example, the low speed multiplexer 104 may transfer (e.g., pass through) the signal INL received by the input port 130 as an output as one of the signals LA-LN transmitted from one of the output ports 132a-132n. In one example, when the number of output ports 132a-132n is four, the low speed multiplexer 104 may implement a 4:1 low speed multiplexer path.

The enable port 134 may be a unidirectional input for the low speed multiplexer 104. The enable port 134 may receive a signal (e.g., ENL). The signal ENL may be implemented to select one of the output ports 132a-132n. One of the output ports 132a-132n may be enabled in response to the signal ENL. In response to the signal ENL, one of the memory ports 132a-132n may be enabled (e.g., pass through from the signal INL) and the remaining memory ports 132a-132n may be disabled (e.g., tri-stated). In one example, in response to the signal ENL, the low speed multiplexer 104 may enable the output port 132a and tri-state the output ports 132b-132n and the data from the signal INL may be passed through the output port 132a and output as the signal LA.

The channel decoder 106 may comprise an input 140, outputs 142a-142b and/or an input 144. The input 140 of the channel decoder 106 may be configured to receive a signal (e.g., EN). The outputs 142a-142b of the channel decoder 106 may be configured to present the signal ENH and/or the signal ENL. The input 144 of the channel decoder 106 may receive a selection signal (e.g., SEL). The channel decoder 106 may comprise a block (or circuit) 108 and/or a block (or circuit) 110. The circuit 108 may be configured to implement a command decoder. The circuit 110 may be configured to implement a channel multiplexer control. The channel decoder 106 may comprise other components and/or send/receive other input (not shown). In some embodiments, the channel decoder 106 may be implemented as a component of the high speed multiplexer 102 and/or a component of the low speed multiplexer 104. The number of components, arrangement of components and/or the number of input/output sent/received by the channel decoder 106 may be varied according to the design criteria of a particular implementation.

The signal EN may be generated by the controller 60. In one example, the signal EN may be configured to enable/disable the memory channel 84i. For example, when the signal EN disables the channel decoder 106, the high speed multiplexer 102 and the low speed multiplexer 104 may not transmit signals (e.g., no data to/from the memory banks 86a-86n may be transmitted). For example, when the signal EN disables the channel decoder 106, the signal ENH and/or the signal ENL may not be presented (e.g., all of the memory ports 122a-122n and/or the output ports 132a-132n may be tri-stated).

The input 144 may receive the selection signal SEL. The selection signal SEL may be an encoded signal presented by the controller 60. The selection signal SEL may be one of the command signals generated by the controller 60. The selection signal SEL may provide information for determining which of the memory banks 86a-86n should be selected by the multiplexers 100a-100n. The channel decoder 106 may be configured to decode the selection signal SEL. Decoding the selection signal SEL may enable the channel decoder 106 to select one of the memory ports 122a-122n and/or one of the output ports 132a-132n. The channel decoder 106 may select one of the memory ports 122a-122n and/or one of the output ports 122a-122n by generating the signal ENH and/or the signal ENL.

The command decoder 108 may be a module of the channel decoder 106 configured to decode channel selection information from the selection signal SEL. In one example, the command decoder 108 may parse the information in the selection signal SEL and/or extract information indicating which of the memory banks 86a-86n may be selected. The data decoded from the selection signal SEL by the command decoder 108 may be presented to the channel multiplexer control circuit 110.

The channel multiplexer control 110 may be a module of the channel decoder 106 configured to generate the signal ENH and/or the signal ENL. The channel multiplexer control circuit 110 may receive the data decoded from the selection signal SEL by the command decoder 108. Based on the data decoded from the selection signal SEL, the channel multiplexer control 110 may generate the signal ENH and/or ENL configured in a format readable by the high speed multiplexer 102 and/or the low speed multiplexer 104. The channel multiplexer control 110 may format the signal ENH and/or the signal ENL to enable one of the memory ports 122a-122n and/or one of the output ports 132a-132n corresponding to the selection signal SEL. Generally, the selection of the memory ports 122a-122n and/or the selection of the output ports 132a-132n may correspond.

In one example, when the signal ENH is configured to select the memory port 122c, the signal ENL may be configured to select the corresponding output port 132c. In some embodiments, the signal ENH and the signal ENL may be one signal sent to both the high speed multiplexer 102 and the low speed multiplexer 104 to select the corresponding ports.

In the example shown, the signal INL may comprise the selection signal SEL. The selection signal may be presented as one of the low speed signals. For example, the signal INL may be presented to the input 130 of the low speed multiplexer 104 and the input 144 of the channel decoder 106.

In the example shown, the signal INL and the selection signal SEL is shown as one signal INL(SEL). In some embodiments, the selection signal IN may comprise the selection signal SEL (e.g., one signal IN(SEL) to be described in association with FIG. 4). The signal SEL may be embedded in the signal INL by the controller 60. In one example, the selection signal SEL may comprise one or more bits of the signal INL. In another example, the selection signal SEL may be the same signal as the signal INL (e.g., the components of the solid state drive 50 may be unaware of any difference between the signal INL and the signal SEL unless decoded by the channel decoder 106).

The controller 60 (e.g., the MCU 62e of the solid state drive 50) may send a command to the expander circuit 90. The command may be received by the multiplexers 100a-100n. In one example, the command may be a new command. In another example, the command may be a conventional command. The command may be decoded by the multiplexer 100i.

The controller 60 may embed the channel selection control signal SEL into the signal INL. The NAND flash (e.g., the cells of the memory banks 86a-86n) may ignore the control signals. The multiplexer 100i may decode the command signals to select one of the memory banks 86a-86n, accordingly.

In one example, the low speed signal INL may comprise the signal CE along with the selection signal SEL. If the signal CE is high, then the memory channel (e.g., 84i) may not be selected. When the memory channel is not selected, the NAND flash may ignore all other signals. The selection signal portion SEL of the signal INL may be used by the channel decoder 106 as the multiplexer decoding enable. So when the signal CE is high, then the multiplexer 100i may decode the selection signal SEL from other data on the bus (e.g., data in the signal INL).

Figure 4:
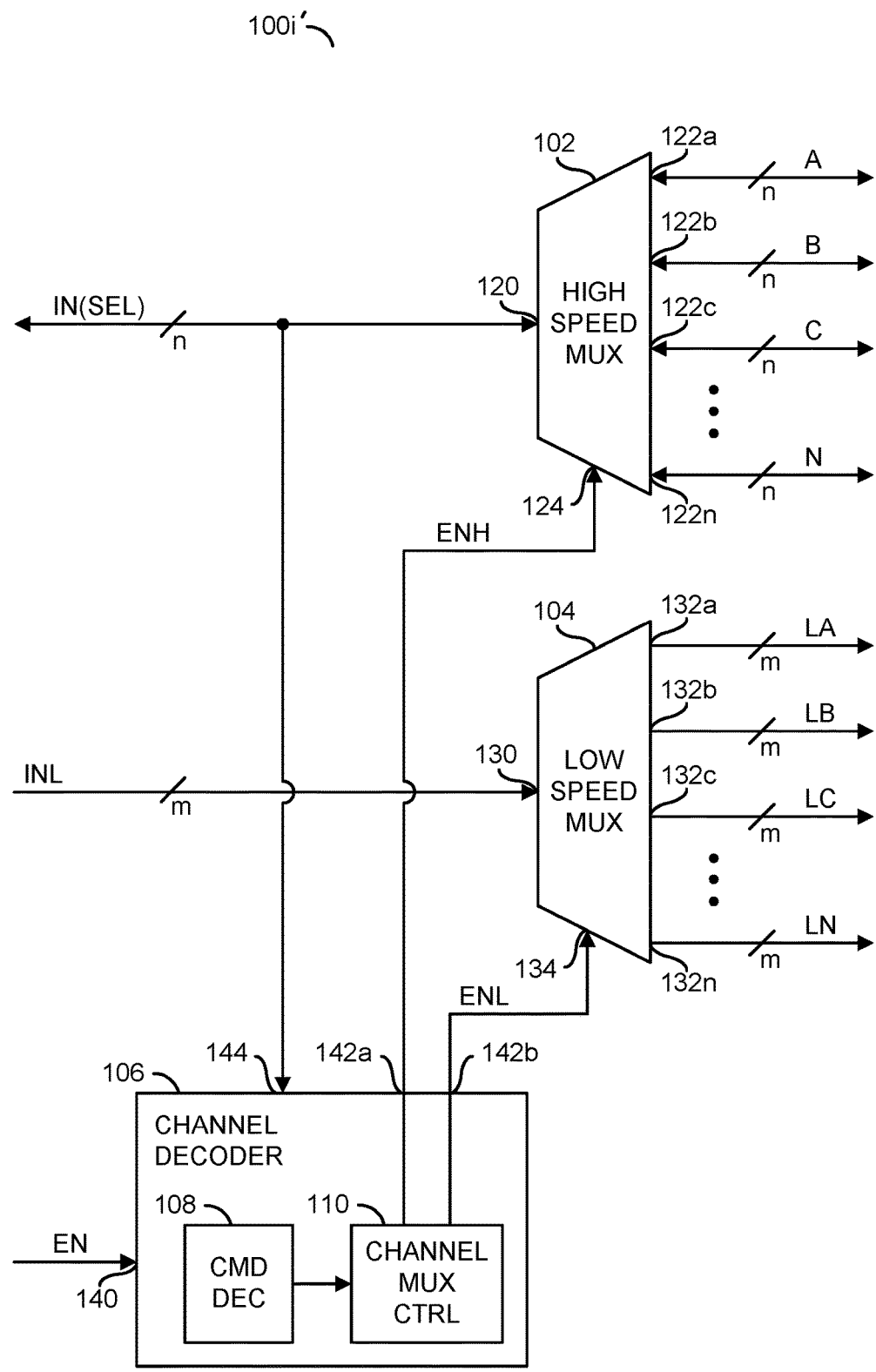
FIG. 4 is a block diagram illustrating an alternate embodiment of a multiplexer pair.

Referring to FIG. 4, a block diagram illustrating an alternate embodiment of a multiplexer pair 100i' is shown. The multiplexer pair 100i' may be a representative example of the multiplexers 100a-100n. In the alternate embodiment, the multiplexer pair 100i' may receive the selection signal SEL from the controller 60 as a portion of a different signal (e.g., the high speed signal) than the multiplexer pair 100i described in FIG. 3.

In the example shown, the signal IN may comprise the selection signal SEL. The selection signal SEL may be presented as one of the high speed signals. For example, the signal IN may be presented to the input 120 of the high speed multiplexer 102 and the input 144 of the channel decoder 106. The controller 60 (e.g., the MCU 62e of the solid state drive 50) may send a command to the expander circuit 90 as the high speed signal IN. The command may be decoded by the multiplexer 100i'.

The controller 60 may embed the channel selection control signal SEL into the signal IN. The NAND flash (e.g., the cells of the memory banks 86a-86n) may ignore the control signals. The multiplexer 100i' may decode the command signals to select one of the memory banks 86a-86n, accordingly. For example, in some commands from the controller 60, the signal IN may be transmitted to the controller port 120 and the input port 144 and in some commands from the controller 60, the signal SEL may be transmitted to the controller port 120 and the input port 144.

In some embodiments (e.g., the example multiplexer pair 100i described in association with FIG. 3 and/or the example multiplexer pair 100i' described in association with FIG. 4), the controller 60 may present the selection signal SEL on one input. In one example, the multiplexer pair 100i may have a connection from the input 130 of the low speed multiplexer 104 to the input 144 of the channel decoder 106. In another example, the multiplexer pair 100i' may have a connection from the input 120 of the high speed multiplexer 102 to the input 144 of the channel decoder 106.

The particular one of the inputs (e.g., 120 and/or 130) connected to the input 144 for receiving the selection signal SEL may be implemented based on the commands provided by the controller 60. The design of the multiplexers 100a-100n may be varied based on the commands issued by the controller 60. For example, the multiplexers 100a-100n may be designed in response to pre-determined instructions implemented by a manufacturer of the controller 60. Similarly, the instructions implemented by the manufacturer of the controller 60 may be determined in response to the design of the multiplexers 100a-100n.

In some embodiments, the low speed multiplexer 104 may implement unidirectional ports (e.g., from the controller 60 to the memory banks 86a-86n). Each of the input port 130 and the output ports 132a-132n may comprise a 4-bit bus width. In some embodiments, the high speed multiplexer 102 may implement bidirectional ports having a 400 MHz bandwidth. Each of the controller port 120 and the memory ports 122a-122n may comprise a 12-bit bus width. Each of the controller port 120 and the memory ports 122a-122n may have a pin to pin output skew of less than 50 ps, a propagation delay of less than 100 ps and/or an insertion loss of less than 2 dB.

The high speed multiplexer 102 and/or the low speed multiplexer 104 may implement a tri-state for deselected ports. In one example, the high speed multiplexer 102 and/or the low speed multiplexer 104 may implement a 1:4 multiplexer with separate high speed and low speed groups. The high speed multiplexer 102 and/or the low speed multiplexer 104 may be configured to support SSTL18 and/or SSTL12 signaling. In one example, the high speed multiplexer 102 and/or the low speed multiplexer 104 may comprise a Ron of 8 Ohms at a condition of 0.9 V. The high speed multiplexer 102 and/or the low speed multiplexer 104 may be configured to implement 'break before make' switching. The high speed multiplexer 102 and/or the low speed multiplexer 104 may have extremely low power dissipation.

In some embodiments, the signal IN may comprise ONFI-compliant signals such as DQ[7:0], DQS+, DQS− and/or other higher speed control. For example, the signal IN may be used for higher speed data. The signal INL may comprise lower speed control. The signal EN may be a lowest speed control line that does not use the ports of the high speed multiplexer 102 and/or the low speed multiplexer 104.

Figure 5:
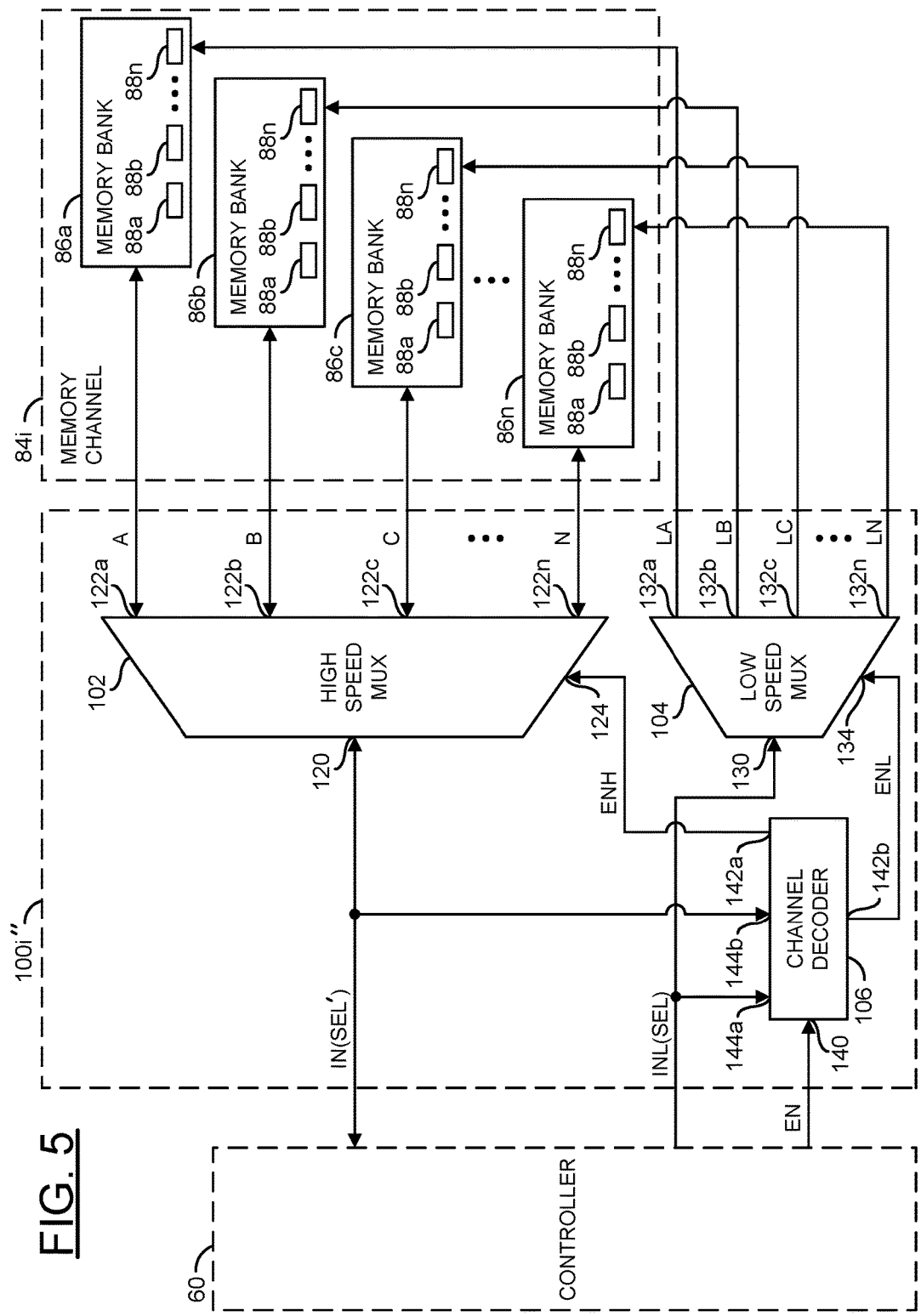
FIG. 5 is a block diagram illustrating a multiplexer pair selecting a memory bank.

Referring to FIG. 5, a block diagram illustrating the multiplexer pair 100i'' selecting the memory banks 86a-86n is shown. The multiplexer pair 100i'' may be a representative example of the multiplexers 100a-100n. The multiplexer pair 100i'' may be shown in the context of the solid state drive 50. The multiplexer pair 100i'' is shown connected to the controller 60 and the associated memory channel 84i.

The controller 60 is shown presenting/receiving the high speed signal(s) IN to/from the multiplexer pair 100i''. The controller 60 is shown presenting the low speed signal(s) INL and the signal EN to the multiplexer pair 100i''. At least one of the signal(s) IN and/or the signal(s) INL may comprise the selection signal SEL. In the example shown, the selection signal SEL may be the signal INL and the selection signal SEL' may be the signal IN.

The multiplexer pair 100i'' may implement the channel decoder 106 having the inputs 144a-144b. The input 144a may be connected to the input port 130. The input 144b may be connected to the controller port 120. The multiplexer pair 100i'' may be configured to receive the selection signal SEL as the signal INL and/or as the selection signal SEL' as the signal IN. The channel decoder 106 may receive the selection signal (e.g., SEL and/or SEL') at the input 144a and/or the input 144b, decode the selection signal (e.g., SEL and/or SEL') and generate the signal ENH and/or ENL to select one of the memory ports 122a-122n and one of the output ports 132a-132n in response to the decoded selection signal (e.g., SEL and/or SEL').

In some embodiments, the controller 60 may operate in one or more modes for selecting the memory banks 86a-86n. For example, in one mode of operation, the controller 60 may present the selection signal SEL' as the high speed signal IN, and the channel decoder 106 may receive the selection signal SEL' at the input 144b. In another example, in another mode of operation, the controller 60 may present the selection signal SEL as the low speed signal INL, and the channel decoder 106 may receive the selection signal SEL at the input 144a.

The multiplexers 100a-100n may be configured to support receiving the selection signal SEL' at the input 144 from the high speed signal IN, or support receiving the selection signal SEL at the input 144 from the low speed signal INL, or support receiving the selection signal (e.g., SEL and/or SEL') at the input 144a-144b from either the high speed signal IN and the low speed signal INL based on a mode of operation of the controller 60, or support receiving the selection signal (e.g., SEL and/or SEL') at the inputs 144a-144b at the same time (or nearly the same time) from both the high speed signal IN and the low speed signal INL. The whether the selection signal (e.g., SEL and/or SEL') comes either on the signal IN or the signal INL may depend on the design of the controller 60.

Each of the memory ports 122a-122n are shown connected to a respective one of the memory banks 86a-86n of the associated memory channel 84i. Each of the output ports 132a-132n are shown connected to a respective one of the memory banks 86a-86n. Each of the memory banks 86a-86n may comprise blocks (or circuits) 88a-88n. The circuits 88a-88n may be memory storage units. In one example, the memory storage units 88a-88n may be the NAND flash cells of the memory banks 86a-86n. The number of memory storage units 88a-88n may be varied according to the design criteria of a particular implementation.

Selecting one of the memory ports 122a-122n in response to the signal ENH may enable communication between the high speed multiplexer 102 and one of the memory banks 86a-86n. In one example, enabling the memory port 122b may enable data to be transferred from the memory bank 86b (e.g., as the signal B), and output from controller port 120 as the signal IN.

Similarly, selecting one of the output ports 132a-132n in response to the signal ENL may enable communication from the low speed multiplexer 104 to one of the memory banks 86a-86n. In one example, enabling the memory port 122c may enable data to be transferred from the controller 60 as the signal INL, and output from the low speed multiplexer 104 at the output port 132c (e.g., as the signal LC) and to the memory bank 86c of the associated memory channel 84i.

Generally, the selection signal (e.g., SEL and/or SEL') may be decoded by the multiplexer 100i'' to select corresponding memory ports 122a-122n and output ports 132a-132n. In one example, the channel decoder 106 may decode the selection signal (e.g., SEL and/or SEL') received by the inputs 144a-144b and generate the signal ENH and the signal ENL configured to select the memory port 122a and the corresponding output port 132a. For example, the low speed signal(s) LA may select one or more of the memory units 88a-88n of the memory bank 86a and the high speed signal(s) A may transfer data to/from the memory units 88a-88n of the memory bank 86a.

The apparatus 100 may implement a multiplexer for the solid state drive 50 (e.g., a SSD MUX). The apparatus 100 may be configured to receive one or more NAND flash signals (e.g., IN, INL and/or EN). The apparatus 100 may be configured to decode a channel selection control command (e.g., SEL and/or SEL') from the NAND flash signals. The NAND flash signals may be generated by the hardware logic (e.g., the processor 62e) of the SSD controller 60. Generating the channel selection control command from the controller hardware logic may reduce (e.g., eliminate) channel selection delay added by control of the GPIO 62g. The apparatus 100 may improve random read/write performance of the solid state drive 50. The improvement to the performance of the solid state drive 50 may be measured in the actual product (e.g., in a SSD benchmark).

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

Although embodiments of the invention have been described in the context of a SSD and/or ONFI-compliant application, the present invention is not limited to SSD and/or ONFI-compliant applications, but may also be applied in other high data rate digital communication applications. The present invention addresses concerns related to high speed communications, flexible data storage structures, specified command sets and lossy transmission lines. Future generations of SSDs and/or ONFI may provide increasing speed, more flexibility, additional commands and different propagation characteristics. The present invention may also be applicable to memory systems implemented in compliance with either existing (legacy) memory specifications or future memory specifications.

While the invention has been particularly shown and described with reference to embodiments thereof, it will be understood by those skilled in the art that various changes in form and details may be made without departing from the scope of the invention.

The invention claimed is:

1. An apparatus comprising:
   a first circuit comprising (i) a controller port and (ii) a plurality of memory ports;
   a second circuit comprising (i) an input port and (ii) a plurality of output ports; and
   a channel decoder configured to (A) decode a selection signal and (B) select (i) one of said plurality of memory ports and (ii) one of said plurality of output ports in response to said decoded selection signal, wherein (i) said selection signal is received by (a) said controller port and said channel decoder in a first mode and (b) said input port and said channel decoder in a second mode, (ii) said first circuit implements a first multiplexer path operating at a first speed, (iii) said second circuit implements a second multiplexer path operating at a second speed and (iv) said first speed is greater than said second speed.

2. The apparatus according to claim 1, wherein said selection signal is embedded in a command sent to said apparatus by a solid state drive controller.

3. The apparatus according to claim 2, wherein (i) a plurality of memory modules ignore said selection signal and (ii) decoding said selection signal is implemented to select one memory bank from a plurality of memory banks.

4. The apparatus according to claim 1, wherein decoding said selection signal bypasses a delay associated with selecting a memory bank based on a signal sent from a general purpose input/output pin of a solid state drive.

5. The apparatus according to claim 1, wherein (i) said controller port and said plurality of memory ports are each bidirectional and (ii) said input port and said plurality of output ports are each unidirectional.

6. The apparatus according to claim 1, wherein said first circuit is configured to transmit data signals between a memory controller circuit and a plurality of memory banks.

7. The apparatus according to claim 1, wherein said second circuit is configured to transmit control signals from a memory controller circuit and a plurality of memory banks.

8. The apparatus according to claim 1, wherein (i) said controller port and said input port are configured to interface with a controller circuit of a solid state drive and (ii) said memory ports and said output ports are configured to interface with memory banks.

9. The apparatus according to claim 1, wherein said apparatus implements a first speed/second speed multiplexer pair.

10. The apparatus according to claim 1, wherein said apparatus implements a memory expander for a solid state drive.

11. The apparatus according to claim 10, wherein said memory expander is configured to increase an amount of memory banks accessible by a controller circuit.

12. The apparatus according to claim 11, wherein a number of said memory banks associated with said apparatus is four.

13. The apparatus according to claim 1, wherein said apparatus comprises four of said memory ports and four of said output ports.

14. The apparatus according to claim 1, wherein (i) said apparatus is associated with one memory channel and (ii) said memory channel comprises a plurality of memory banks.

15. The apparatus according to claim 14, wherein (i) a memory circuit comprises a plurality of said memory channels, (ii) a plurality of said apparatuses are implemented and (iii) each of said plurality of said apparatuses are configured to transfer data to/from said plurality of memory banks of an associated one of said memory channels.

16. An apparatus comprising:
a first circuit comprising (i) a controller port and (ii) a plurality of memory ports;
a second circuit comprising (i) an input port and (ii) a plurality of output ports; and
a channel decoder configured to (A) decode a selection signal and (B) select (i) one of said plurality of memory ports and (ii) one of said plurality of output ports in response to said decoded selection signal, wherein (i) said selection signal is received by said controller port and said channel decoder, (ii) said selection signal is transmitted to (a) said first circuit and (b) said channel decoder from a solid state drive controller, (iii) said controller port and said input port are configured to interface with said solid state drive controller and (iv) said memory ports and said output ports are configured to interface with memory banks.

17. The apparatus according to claim 16, wherein (i) said first circuit implements a first multiplexer path operating at a first speed, (ii) said second circuit implements a second multiplexer path operating at a second speed and (iii) said first speed is greater than said second speed.

18. An apparatus comprising:
a first circuit comprising (i) a controller port and (ii) a plurality of memory ports;
a second circuit comprising (i) an input port and (ii) a plurality of output ports; and
a channel decoder configured to (A) decode a selection signal and (B) select (i) one of said plurality of memory ports and (ii) one of said plurality of output ports in response to said decoded selection signal, wherein (i) said selection signal is received by said input port and said channel decoder, (ii) said selection signal is transmitted to (a) said second circuit and (b) said channel decoder from a solid state drive controller, (iii) said first circuit implements a first multiplexer path operating at a first speed, (iv) said second circuit implements a second multiplexer path operating at a second speed and (v) said first speed is greater than said second speed.

* * * * *